No. 663,361. Patented Dec. 4, 1900.
S. D. & M. G. PHELAN.
CULINARY UTENSIL.
(Application filed June 15, 1900.)
(No Model.)
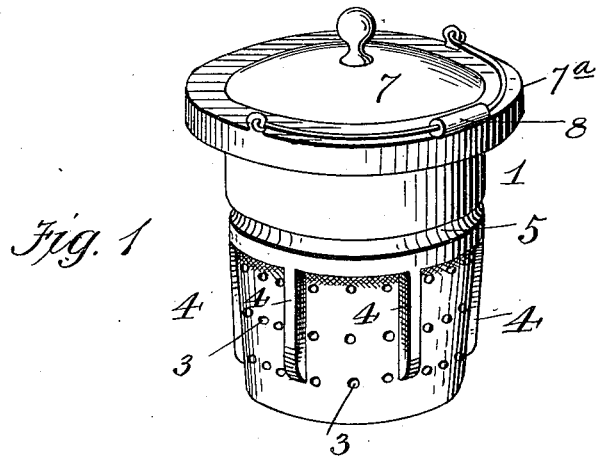
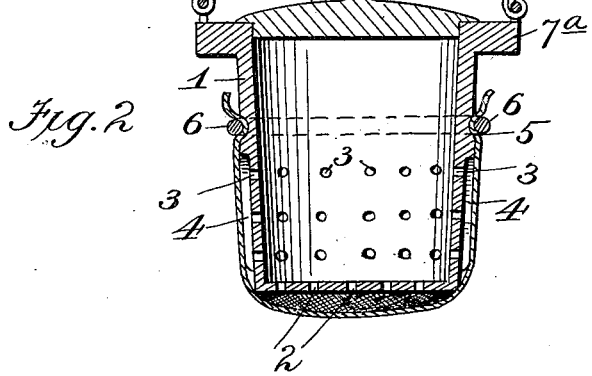
Witnesses
Inventors:
Stephen D. Phelan.
Mattie G. Phelan,
By Attorneys

UNITED STATES PATENT OFFICE.

STEPHEN D. PHELAN AND MATTIE G. PHELAN, OF POPLAR BLUFF, MISSOURI.

CULINARY UTENSIL.

SPECIFICATION forming part of Letters Patent No. 663,361, dated December 4, 1900.

Application filed June 15, 1900. Serial No. 20,460. (No model.)

*To all whom it may concern:*

Be it known that we, STEPHEN D. PHELAN and MATTIE G. PHELAN, citizens of the United States, residing at Poplar Bluff, in the county of Butler and State of Missouri, have invented new and useful Improvements in Culinary Utensils, of which the following is a specification.

Our invention relates to cooking utensils; and the object of the same is to provide a vessel which can be used for a variety of purposes about a kitchen and which will be simple in construction, efficient in use, and which may be manufactured at a slight cost.

With these ends in view our invention consists of a cooking vessel having a number of perforations in the side and bottom thereof and a number of vertical ribs near said perforations in the side of the vessel in order that a straining-cloth may be placed around the vessel in a manner that will not permit the cloth to cling to the vessel and interfere with the straining operation. We also provide means for holding the straining-cloth in position around the vessel.

In the accompanying drawings, Figure 1 is a perspective view of a cooking utensil made in accordance with our invention. Fig. 2 is a vertical section through the same, showing the straining-cloth in place. Fig. 3 is a perspective view of the clamping-ring for the straining-cloth.

Like numerals designate like parts wherever they occur in the different views.

In said drawings, 1 is a vessel which may be of any suitable shape and may be conveniently made of sheet metal; but any suitable material or metal may be used. The bottom of the vessel is provided with a number of perforations 2 and the side of the vessel is also perforated at 3. These perforations 3 are arranged in vertically-disposed rows, and near each row of perforations a rib 4 is formed in the side of the vessel. Above these perforations a groove 5 is formed, said groove extending entirely around the vessel. A clamping-ring 6 is seated in this groove. The vessel is provided with a flange $7^a$ at the top, a suitable cover 7, and a handle 8.

When it is desired to use the vessel, a straining-cloth may be attached by passing it up around the vessel inside the clamping-ring. If vegetables or soup are to be cooked in the vessel, the vegetables or meats will be strained by merely lifting the vessel from the boiler or kettle containing the water. In cooking soups this utensil is particularly useful, as the small pieces of bone from the meat is strained out by the act of lifting the vessel and the use of an ordinary skimmer is obviated. Vegetables cooked in this utensil are thoroughly strained and cannot be burned while cooking. The ribs 4 hold the straining-cloth away from the vessel and do not permit the perforations to be stopped up by the cloth clinging to the vessel. The clamping-ring may be of spring-wire and separated at $6^a$, so that it may be sprung around the straining-cloth.

From the foregoing it will be obvious that a vessel made in accordance with our invention is capable of many uses about a kitchen for cooking fruits, vegetables, meats, or soups, and that the act of removing the vessel containing the materials cooked will strain them.

Having thus fully described our invention, what we claim is—

A cooking vessel provided with a series of perforations in its bottom, rows of perforations in the side of the vessel, a series of ribs extending vertically between the rows of perforations, a groove extending around the vessel, a clamping-ring seated in said groove, and a straining-cloth clamped by the ring, substantially as described.

In testimony whereof we have hereunto set our hands in presence of two subscribing witnesses.

STEPHEN D. PHELAN.
MATTIE G. PHELAN.

Witnesses:
W. W. BOYT,
CHARLES M. MORGAN.